UNITED STATES PATENT OFFICE.

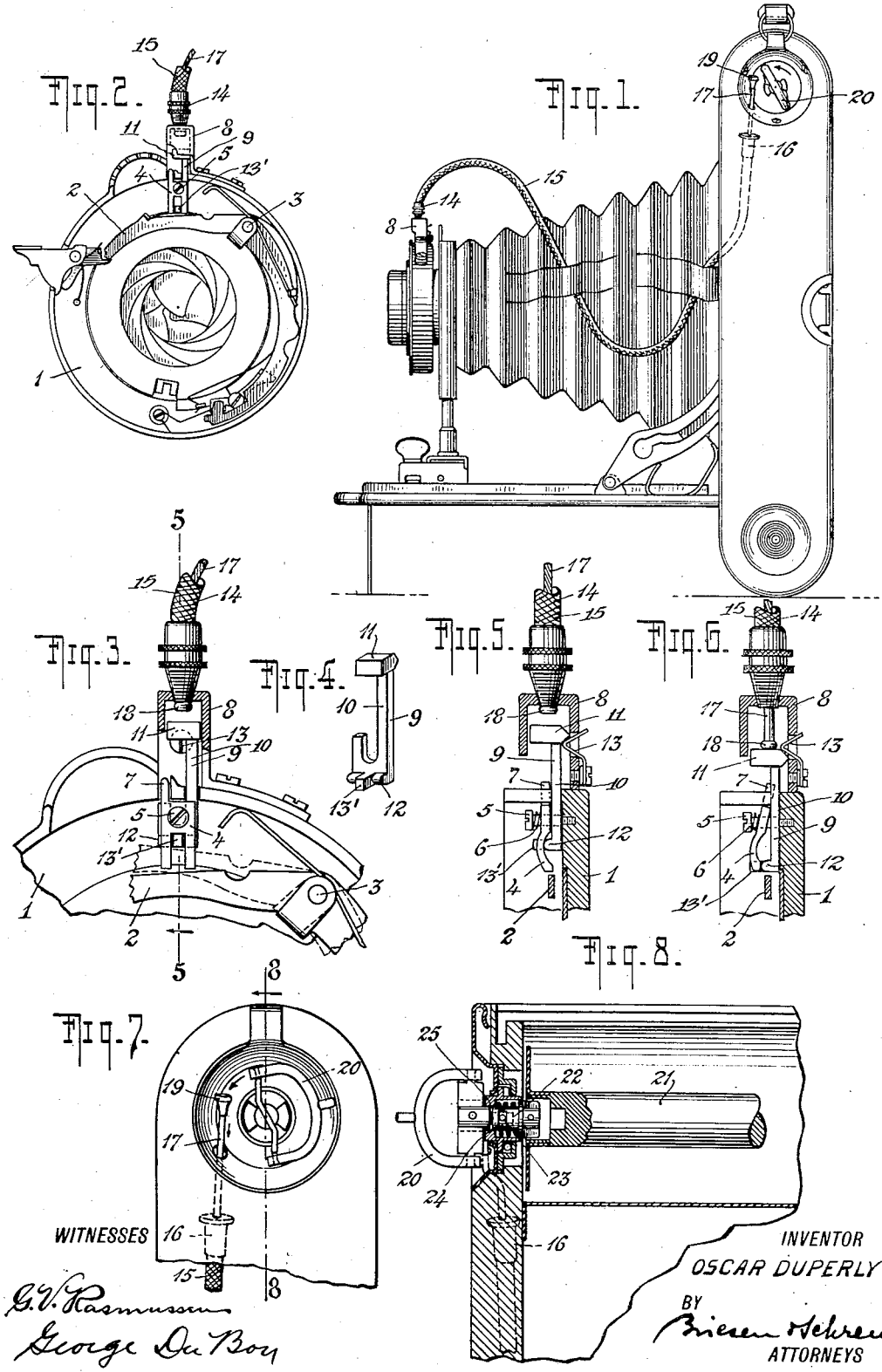

OSCAR DUPERLY, OF MEDELLÍN, COLOMBIA.

PHOTOGRAPHIC CAMERA.

1,271,022.     Specification of Letters Patent.     Patented July 2, 1918.

Application filed June 22, 1916. Serial No. 105,110.

*To all whom it may concern:*

Be it known that I, OSCAR DUPERLY, a citizen of the United States of Colombia, and a resident of Medellín, Columbia, have invented certain new and useful Improvements in Photographic Cameras, of which the following is a specification.

My invention relates to photographic cameras and particularly to means for avoiding unintentional double exposure of plates or films employed in such cameras.

My invention has for its object to provide a means for avoiding double exposure as aforesaid, which means may be employed with either plate or film cameras. A further object of my invention is to provide a means for avoiding double exposure, which, when applied to film cameras of the cartridge type, may be so related to the mechanism for advancing the film that more than one exposure upon a given section of the film is automatically precluded and no second exposure can be made until the film has been advanced to exposure position for the next section. The device is so arranged, however, that this automatic inhibition of a second exposure may be removed for any given film section at the will of the operator.

In the case of photographic cameras provided with the usual shutter, it often happens that, through inadvertence or forgetfulness, the shutter is snapped a second time after an exposure has already been made. This not only causes a money loss equal to the value of the spoiled section of film but also often results in the loss of a picture which, for one reason or another, cannot be taken over again.

Briefly described, my invention for avoiding double exposure comprises an attachment connected with the shutter whereby the shutter opening mechanism is positively and automatically locked after each exposure. This mechanism may be so arranged that it may be unlocked by hand in order to again operate the shutter for the next exposure; or, in cameras of the cartridge type, it may be associated in such a way with the winding reel which advances the film that the shutter is automatically unlocked by engagement with some portion of the reel, or parts moving synchronously therewith as it is operated.

My invention will be better understood by referring to the accompanying drawings in which Figure 1 represents a side elevation of a cartridge camera, of a well known type, with a preferred form of my invention embodied therein; Fig. 2 represents an enlarged front elevation of the shutter of said camera, the front, lens carrying plate being removed so as to show the mechanism of the shutter; Fig. 3 represents a view on a still larger scale of the upper portion of Fig. 2; Fig. 4 is a perspective view of the sliding wedge by means of which the shutter lock is thrown into position; Fig. 5 is a central section taken along the line 5—5 of Fig. 3, showing the shutter lock in operative position; Fig. 6 is a view, similar to Fig. 5, but showing the shutter lock in inoperative position; Fig. 7 is a view, on an enlarged scale, of the upper half of the camera box proper; and Fig. 8 is a section taken along the line 8—8 of Fig. 7.

My invention comprises, in the embodiment shown, the combination, with the camera and shutter, of a shutter locking member which, when the shutter closes after exposure, automatically moves into such a position as to prevent the movement of some part of the shutter operating mechanism, which part must move if the shutter is to be opened. A tension and compression tripping device of the well known type commonly employed for operating shutters, as described in patent to Becker, No. 975,601, dated November 15, 1910, has its two ends so related to the shutter locking member and to the winding key which rotates the winding reel and advances the film that, when the winding key is turned, it comes into contact with an end of this tripping device and, as its rotation continues in advancing the film, actuates the device so as to unlock the shutter.

In the drawings, the shutter 1 is of any usual type and the bar 2, which is pivoted at 3, is a member of this shutter which must be raised in order that the shutter may be opened. Immediately over the bar 2 is placed a shutter lock 4 comprising a thin metal piece having the shape of an inverted U, the legs of the U being bowed forward as shown in Figs. 5 and 6. This piece 4 is loosely suspended from a screw 5 attached to the inside of the shutter casing and spring 6 tends to keep the piece 4 pressed toward the rear of the casing. Preferably, I provide the piece 4 with an upwardly projecting lug 7 which fits loosely into a slot provided for it in the top rim of the shutter casing. This lug and slot serves as a guide to prevent any shifting of the piece 4 to the one side or the other.

A bracket 8 is mounted upon the outside of the shutter casing rim and serves as a housing for a vertically slidable shutter lock wedge 9 having a staff 10 which is slidably disposed in a suitable slot in the shutter frame, a top pressure block 11 and a bottom thrust member 12. This thrust member has a curved front edge which engages the concave side of the legs of shutter lock 4. The rear of pressure block 11 is V shaped and a spring 13 fastened to the rear of bracket 8 is so disposed as to engage either the lower side of the V and hold the wedge in the upper position shown in Fig. 5; or to engage the upper side of the V and hold the wedge in the lower position shown in Fig. 6. With the wedge in the upper position (Fig. 5), the legs of shutter lock 4 are directly above the bar 2 so that the bar 2 cannot be raised. When the wedge is in the lower position (Fig. 6), the thrust member 12 has pushed the legs of shutter lock 4 forwardly of the bar 2 so that bar 2 can be raised.

A square lug 13' projects forwardly from the thrust member 12 and fits loosely between the legs of the shutter lock 4; this assists in guiding both the shutter lock wedge 9 and the shutter lock 4.

In the top of bracket 8, immediately above pressure block 11, is attached one end 14 of the inextensible pull member of the tripping device 15 before referred to. The other end 16 of this pull member is fastened permanently and fixedly in a suitable recess of the camera box proper. The flexible incompressible push member 17 which is contained within the pull member has one of its ends 18 normally held by a spring (not shown) against the inner top surface of bracket 8 as shown in Figs. 3 and 5. The other or operating end 19 of the push member projects upwardly through the rim of the recessed bearing in which the winding key 20 for the winding reel 21 is rotatably held. The position of this end of the push member is such that, when the winding key is rotated, its upper surface is engaged by the key and the push member thrust inwardly into the pull member for a substantial distance before the winding key can pass.

The operation of my invention is as follows:—

Assume the parts to be in the position shown in Figs. 3 and 5 with the legs of the shutter lock 4 immediately above the operating bar 2. This position corresponds as will be seen, to that which will be brought about immediately after an exposure has been made and before the film has been advanced for another exposure. The winding key 21 is now rotated in the direction shown by the arrow until the next section of the film is in position to be exposed, as will be indicated in the usual way. To thus advance the film will require several rotations of the winding key. During the first revolution of the key one end of the same will engage the top of end 19 of the push member and will move it inwardly with respect to the pull member so as to bring the end 18 into engagement with the pressure block 11 and force the shutter locking wedge 9 downwardly so as to force the shutter lock 4 outwardly as indicated in Fig. 6. Immediately the winding key has passed the end 19 the push member 17 will be returned to its original position (Figs. 1 and 7). During the successive revolutions of the winding key required for the complete advance of the film to the position for the next exposure, the push member 17 will be depressed each time but this will merely result in idle depression and retraction of the push member alone inasmuch as the wedge will be permanently held in the lowermost position shown in Fig. 6 by reason of the spring 13, pressing against the upper side of the V of the pressure block 11. The shutter lock 4 is therefore permanently held forwardly and out of the plane of the bar 2. The shutter may now again be operated in the usual way inasmuch as the bar 2, in its upward movement, will encounter no resistance except that due to the weight of the wedge 9 and the downward pressure of spring 13. Both of these forces are, however, exceedingly slight and are not appreciable in comparison with the forces usually available to raise the bar 2 in operating the shutter.

Should it be necessary or desirable, at any time, to make a second exposure upon the same section of film, the shutter may be unlocked after the first exposure, without moving the film in any way, by depressing the end 19 of push member 17 by hand.

In cameras of the cartridge type, the winding key and winding reel are usually locked together in such a way that they can only rotate simultaneously in one and the same direction. In the embodiment of my invention shown in the accompanying drawings, it is obvious that, in order to bring a succeeding section of film in correct position for exposure, it might sometimes be necessary to stop the winding key and reel in such a position that the incompressible push member 17 would be pushed inwardly, as shown in Fig. 6. Should the winding key remain in this position, it would be impossible to open the shutter, inasmuch as the bar 2, as it lifted, would not only have to raise the shutter lock wedge 9, but would also have to overcome the much greater resistance necessary to raise the push member 17 and turn back the winding key 20 and winding reel 21. Furthermore, even if the usual mechanism of cartridge cameras permitted the winding reel to be turned back (which it does not) it would be practically impossible in practice to thus turn the winding reel back since to do so would cause wrinkling of the film and would take a large part, if not all, of the section of film to be exposed out of the focal plane. To avoid this difficulty, I divide the shaft 22 of the winding key into two parts, the outer part being of smaller diameter than the inner and fitting loosely into a hole drilled axially into the latter. A transverse slot 23 in the part of larger diameter and a pin 24 in the part of smaller diameter will permit the outer part (carrying the winding key proper) to be moved backwardly from its extreme forward position through an angle of something like 45° without in any way affecting the position of the winding reel proper 21. The hub 25, in which the winding key 20 is linearly slidable in order to disengage it from the winding reel, is provided with the usual ratchet arrangement (not shown) to prevent the hub being given a backward rotation. The outer end of this hub has oppositely V-shaped recesses cut therefrom so as to permit the rotation of the stem of the winding key through the angle established by the slot and pin 23 and 24.

While I have described a specific form and application of my invention, it is obvious that the same may be adapted to shutters and cameras of many types by making suitable mechanical changes within the skill of those versed in the art.

In the claim which follows I speak of that part of the shutter whose movement I prevent or permit by means of my shutter lock, and without the movement of which part the shutter cannot be opened, as a "shutter controlling member".

Having described my invention, I claim:—

In a camera, the combination of a shutter, means for automatically locking the shutter after it has been opened and closed, a winding reel for film said reel having an operating key outside the camera case and a push member one end of which engages the shutter locking means while the other end is supported outside the camera and in position to be engaged and pushed either by the finger at will or by a part of the operating key whereby the shutter is again unlocked, the operating key and the winding reel being connected together by an intermediate member with reference to which said key has a determined amount of angular play, as and for the purpose described.

In testimony whereof I have hereunto set my hand.

OSCAR DUPERLY.